June 22, 1926.  
J. G. MACLAREN  
CONTROLLER FOR PNEUMATIC DISPATCH SYSTEMS  
Filed August 11, 1925  
1,589,538  
2 Sheets-Sheet 2

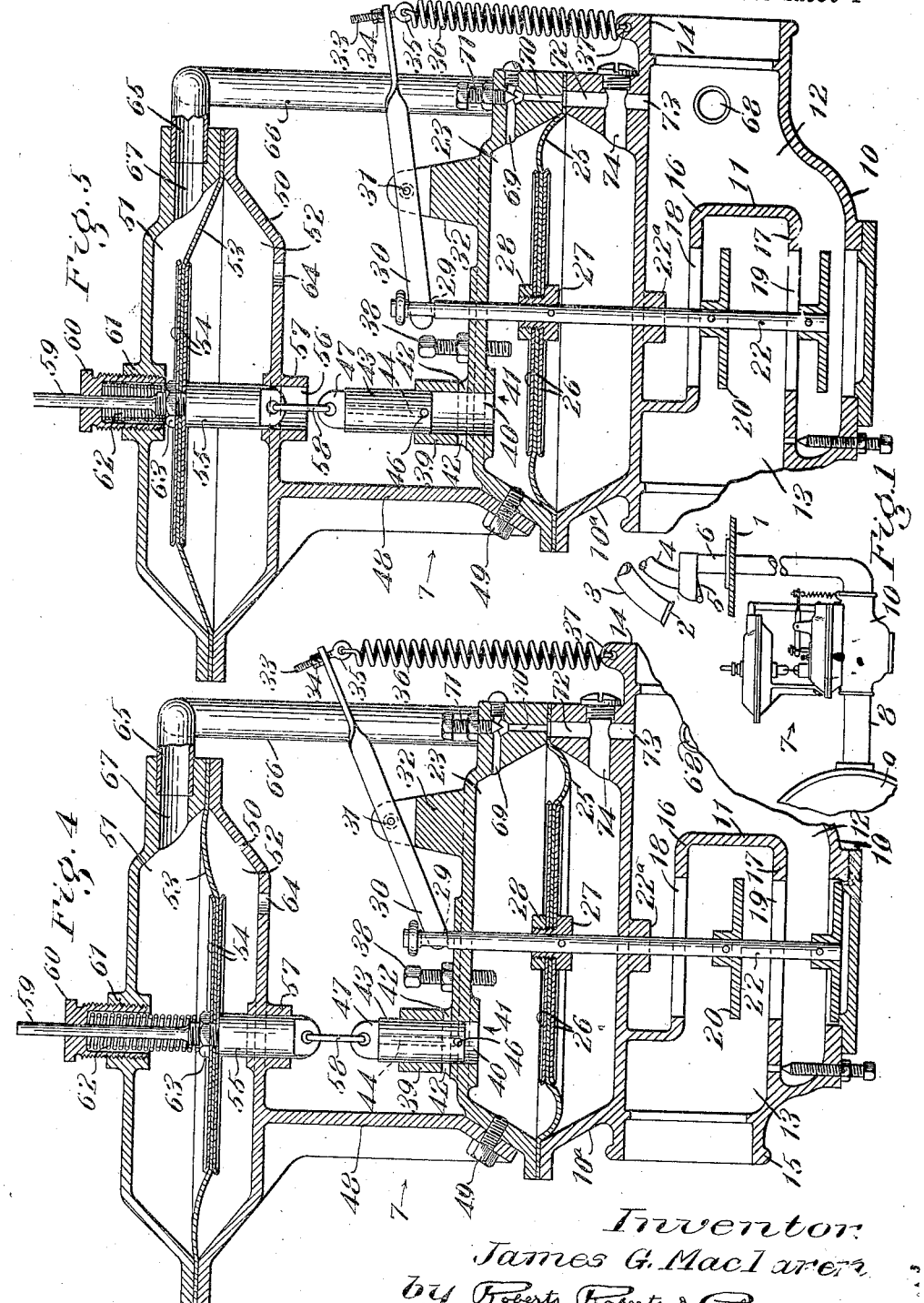

Inventor  
James G. MacLaren  
by Roberts Roberts & Cushman  
Attys

Patented June 22, 1926.

1,589,538

UNITED STATES PATENT OFFICE.

JAMES G. MACLAREN, OF SYRACUSE, NEW YORK, ASSIGNOR TO THE LAMSON COMPANY, OF SYRACUSE, NEW YORK, A CORPORATION OF MASSACHUSETTS.

CONTROLLER FOR PNEUMATIC-DISPATCH SYSTEMS.

Application filed August 11, 1925. Serial No. 49,575.

This invention pertains to power controllers for pneumatic dispatch systems and relates more particularly to automatically actuated controllers of the so-called minimum flow type of which the patent to Libby No. 968,576, August 30, 1910, furnishes an early example.

Pneumatic dispatch tube apparatus of the minimum flow type as exemplified by said Libby patent, are vacuum systems as distinguished from pressure systems as distinguished from closed systems in which normally no air current is maintained through the line when the line is idle. Controllers for said open or continuous current vacuum systems of the minimum flow type, comprise, essentially, a valve for regulating the flow of air through the transit tube toward the air exhauster or vacuum drum, said valve normally cutting down the air current to a minimum when the line is idle, never wholly cutting it off but at all times permitting a continuous flow of relatively small volume called the "minimum" flow,—and a pneumatic, such as a piston or diaphragm, which responds to a change of pressure in the line due to the momentary cutting off or checking of the minimum flow of air by the insertion of a carrier into the tube, and thereby opens the air valve wide to permit a full flow of air for driving the carrier. For convenience and succinctness of description the term "pneumatic" has herein been employed to designate broadly any pressure or vacuum actuated instrumentality, for example a flexible diaphragm, a piston or a bellows, by means of which fluid pressure is converted into mechanical motion.

While most minimum flow power controls employ substantially equivalent means for opening the air controlling valve when a carrier is introduced into the tube in the manner just described, various expedients have been resorted to for initiating closure of the valve. For example the patent to Libby is representative of devices of that type in which a so-called "time-off" mechanism determines closure of the air valve at the end of a predetermined period after its opening, while the patent to Stoetzel No. 1,385,727, dated July 26, 1921, exemplifies that type of control in which the closure of the main valve is dependent wholly upon the pressure change in the system incident to carrier delivery.

In accordance with the present invention I combine features of both of the above types since I employ a time-off device as the primary controlling means, but modify the usual operation of such device by the provision of an element which is sensitively responsive to pressure conditions in the transmission tube. The so-called minimum flow system of control above briefly described is preferred in many cases due to its freedom from electrical connections and other complications and for this reason I have embodied the present invention in the minimum flow type of apparatus.

In the accompanying drawings I have illustrated a preferred embodiment of my invention by way of example and in such drawings:

Fig. 1 is a fragmentary elevation, partly in section, illustrating a portion of the central station apparatus for a pneumatic dispatch system, showing one pair of transmission tubes, of which one is the sending tube and the other the receiving or return tube, and a power control apparatus corresponding to said pair of tubes;

Fig. 2 is a vertical section, to much larger scale, showing the improved power controller with its parts in normal position, the main valve being closed;

Fig. 3 is a view similar to Fig. 2 but showing the main and auxiliary valves in the position which they assume immediately after introduction of a carrier into the transmission tube;

Fig. 4 is a view similar to Fig. 3 but showing the parts as they appear during the normal flight of the carrier;

Fig. 5 is a similar view but showing the momentary disposal of the parts when a carrier is obstructed or slows down during its flight; and Fig. 6 is a perspective view showing an auxiliary valve forming a part of the improved device.

Referring to Fig. 1 of the drawings, the numeral 1 designates a portion of a central station desk provided with a dispatch terminal 2 at the end of the sending transmission tube 3 which leads to an outlying station. The corresponding return transmission tube 4 is provided with the usual delivery terminal 5 and with the extension 6 which passes down through the top of the desk 1 and is connected to the power control apparatus indicated generally by the numeral 7. A suction tube 8 leads from the power control apparatus to the usual suction drum or header 9 in which a vacuum or subatmospheric pressure is constantly maintained by means of a suitable exhauster not shown. A continuous air passage or conduit is thus provided which extends from the terminal 2 to the exhauster, that portion of the conduit provided by the tubes 3 and 4 and the extension 6 of the latter forming the carrier transmission line.

Referring more particularly to Figs. 2 to 6, the improved power controller is illustrated as comprising a hollow casing 10 which is divided by means of a U-shaped septum or partition 11 into an inlet chamber 12 and an outlet chamber 13. The inlet chamber has an entrance defined by an annular flange 14 which receives one end of the tube 6, and the chamber 13 has an outlet orifice defined by an annular flange 15 which receives the end of the tube 8.

The septum 11 has spaced parallel upper and lower walls 16 and 17 provided with coaxial valve orifices 18 and 19 respectively. The spaced heads 20 and 21 of the main air controlling valve control these valve orifices and thereby regulate the flow of air from the chamber 12 to the chamber 13. A minimum flow of air from the chamber 12 to the chamber 13 is provided for at all times, in any usual way, for example, by holding the main valve slightly away from its seat when closed, or by the provision of a small pipe or passage leading from the chamber 12 to the chamber 13.

The heads 20 and 21 of the main valve are fixedly secured to a valve stem 22, which slides in a guide opening in a boss 22$^a$ in the upper wall of chamber 23.

The casing 10 carries an upper or secondary casing 10$^a$, which may, as here shown, be integral with the casing 10, or may be separate therefrom as desired. The secondary or auxiliary casing 10$^a$ is divided into upper and lower chambers 23 and 24 respectively by means of a flexible diaphragm 25, hereinafter referred to as the main pneumatic. The central part of this diaphragm is clamped between stiffening plates 26 and is securely attached to the main valve stem 22 by means of a collar 27 and a clamping nut 28. The stem 22 passes up through the top of the auxiliary casing 10$^a$ and is provided at its upper end with an elongate vertical slot 29 for the reception of the end 30 of a lever fulcrumed at 31 upon a bracket 32 carried by the casing 10$^a$. The other end of this lever is provided with an opening for the reception of a screw threaded rod 33, which is vertically adjustable with respect to the lever by means of an adjusting nut 34. The lower end of the rod 33 is provided with an eye 35 to which the upper end of a tension spring 36 is connected. The lower end of this spring is secured to an ear 37 projecting from the casing 10, and the spring is so tensioned that it tends to hold the diaphragm 25 in the position shown in Fig. 1 with the main valve closed. A stop screw 38, engaging an opening in the upper wall of the casing 10$^a$, may be provided to limit upward movement of the diaphragm 25 in response to the action of the spring 36.

The upper wall of the casing 10$^a$ is furnished with an upstanding boss 39 having a cylindrical bore 40 which opens into the chamber 23 at the point 41. The side walls of the boss 39 are provided with one or more openings 42 leading into the bore 40 at a point intermediate the length of the latter.

The bore 40 receives an auxiliary valve 43 (see Fig. 6) preferably formed as a cylindrical plug having an air tight sliding fit in the bore 40. This plug is provided with a longitudinal air passage 44 opening at the upper end of the plug at the point 45 and terminating at a point near the lower end of the plug in a lateral orifice 46. The upper end of the plug is furnished with an apertured ear 47.

A bracket 48 is attached by means of a bolt 49 or in any other desired manner to the casing 10$^a$. This bracket 48 extends upwardly from the casing 10$^a$ and supports a hollow casing 50 which is divided into an upper chamber 51 and a lower chamber 52 by means of a flexible diaphragm 53 hereinafter referred to as the actuator pneumatic. The central part of this diaphragm 53 is clamped between stiffening plates 54 and secured by means of a nut 63 to the upper end of a guide stem 55, which slides in a bore 56 in a boss 57 at the center of the lower wall of the casing 50. The bore 56 aligns with the bore 40 and the lower end of the stem 55 is permanently connected by means of a link 58 to the ear 47 at the upper end of the valve 43.

An auxiliary stem 59 is secured to the upper end of the stem 55 and this auxiliary guide stem 59 passes through an axial guide opening in the uper end of a gland 60 having screw threaded engagement with a boss 61 at the central part of the upper wall of the casing 50. A compression spring 62 is seated within the gland 60 and tends to hold the diaphragm 53 in its lowermost position as shown in Fig. 2. The spring 62 is stiffer than the spring 36 hereinbefore referred to so that the diaphragm 25 rises in response to a lower suction than the diaphragm 53.

The lower chamber 52 of the casing 50 is always in free communication with the outer atmosphere by means of an orifice 64, while one end 65 of a conduit 66 communicates by means of a passage 67 with the upper chamber 51 of the casing 50. The other end of the conduit 66 opens at the point 68 into the chamber 12 of the casing 10. The conduit 66 is of such diameter that fluctuations in pressure in the transmission tube and chamber 12 are communicated freely and substantially instantaneously to the chamber 51 of the casing 50.

The upper chamber 23 of the casing 10$^a$ communicates by means of restricted passages 69 and 70, controlled by a needle valve 71, with a passage 72 opening at 73 into the chamber 12. A branch passage 74 connects the passage 72 to the lower chamber 24 of the casing 10$^a$. The passages 73 and 74 are of such size that fluctuations in pressure in the chamber 12 are freely transmitted to the chamber 24, while the passages 69 and 70, restricted by means of the needle valve 71, permit but slow movement of air from the chamber 23 to the chamber 12.

The operation of the device is substantially as follows: it being assumed in the first instance that the parts of the power controller occupy the position shown in Fig. 2; that there is no carrier in the transmission tube; and that a proper degree of vacuum is being maintained in the drum 9. Under these circumstances a minimum flow of air is passing through the transmission tube, through the chamber 12 of the casing 10, through the minimum flow passage, and into the chamber 13, and thence through the pipe 8 to the vacuum drum. Moreover, the auxiliary valve 43 is disposed as shown in Fig. 2 so that the passage 44 provides free communication between the chamber 23 and the outer atmosphere.

In the usual operation of apparatus of this kind a vacuum of approximately 16 ounces below atmospheric pressure is maintained in the vacuum drum and the minimum flow pressure, that is to say, the normal pressure in the chamber 12, is approximately one ounce.

When a carrier is introduced into the transmission line, the minimum flow is cut off or reduced, with a consequent decrease in pressure in the chamber 12, the pressure ordinarily being reduced to about 3½ ounces. This reduction in pressure is immediately transmitted through the unrestricted passages 73 and 74 to the chamber 24 and, acting on the diaphragm 25, is sufficient to overcome the spring 36, thereby opening the main valve and permitting a full carrier impelling air current to pass through the transmission tube.

At the instant of the opening of the main valve, and before the carrier has attained its normal speed of movement, the suction in the transmission tube and in the chamber 12 reaches approximately 13 ounces. This momentary high suction is sufficient to raise the actuator diaphragm 53 to the position shown in Fig. 3. In the normal position of the diaphragm 53 the auxiliary valve 43 is disposed as shown in Fig. 2, where its lower end projects into the chamber 23, a distance sufficient to uncover the orifice 46, thus permitting free entrance of air through the passage 44 into the chamber 23. The free communication between the chamber 23 and the outer atmosphere thus provided allows the main diaphragm 25 to move downwardly when the minimum flow is cut off as above described. When the actuator diaphragm 53 is raised to its uppermost position it carries the valve 43 up to the position shown in Fig. 3, where the openings 42 leading to the bore 40 are uncovered, so that, if the main diaphragm 25 has not fully completed its downward movement when the actuator diaphragm 53 rises, the complete downward movement of the diaphragm 25 is not prevented.

As soon as the carrier attains its normal speed of flight the suction in the transmission tube drops slightly, normally to approximately 12 ounces below atmospheric pressure. The spring 62 of the actuator diaphragm 53 is so adjusted, that when this slight drop in suction takes place, the actuator diaphragm sinks to the intermediate position shown in Fig. 4. In this intermediate position of the actuator diaphragm, the valve 43 is moved downwardly to a point such that it closes the passages 42 and at the same time closes the orifice 46 so the entrance of air through the passage 44 is prevented. The upper chamber 23 of the casing 10$^a$ is thus cut off from the atmosphere, and since it communicates by means of the restricted passages 69 and 70 with the chamber 12 in which a high suction now obtains, the air contained in the chamber 23 is gradually withdrawn. As the pressure in the chamber 23 approaches that in the chamber 24, the spring 36 overcomes the slight remaining difference in pressure upon the opposite sides of the diaphragm 25 and closes the main valve. By properly setting the needle valve 71, this closure of the main valve may be made to occur shortly after the carrier has emerged from the transmission tube and under normal conditions and with ordinary transmission lines this would be the usual mode of functioning of the apparatus. When the main valve closes, the pressure in the chamber 12 drops and the spring 62 thereupon restores the diaphragm 53 to the position indicated in Fig. 1, returning the auxiliary valve 43 to its normal position.

While the above operation may be regarded as the normal operation when a single carrier is transmitted through the line, it often happens that a second carrier is introduced before the first has been discharged, while in some lines obstructions are found, such for example, as sharp bends or upwardly directed runs of tube which tend to slow down or stop the carrier. Moreover, if the timing apparatus, comprising the needle valve 71, were improperly set so that the main valve should close or partially close before the carrier emerged from the tube, the carrier would be left idle in the tube. The present arrangement is intended to take care of the above abnormal situations and with the present apparatus any subsequent increase in suction, after the carrier has assumed its normal speed of flight, such for example, as is produced by slowing down of the carrier for any of the above reasons, or such as is produced by the introduction of a second carrier before the first has been discharged, causes the actuator diaphragm 53 to rise from the position of Fig. 4 to that of Fig. 5, where it returns the auxiliary valve 43 to its uppermost position. This again admits full atmospheric pressure to the chamber 23 through the passage 42 and thus allows the main diaphragm 25 to return to the position of Fig. 3, when the main valve is again fully opened. A full flow of air through the transmission tube is thus assured and the parts remain in this position until the carrier or carriers has reassumed its normal flight velocity, whereupon the actuator diaphragm 53 immediately drops to the position of Fig. 4 and the time-off operation is resumed.

The actuator diaphragm 53 thus prevents complete closure of the main valve, so long as a carrier remains in the transmission tube, arresting the slow return movement of the main valve toward its closed position and causing it to resume its fully open position as often as may be necessary to maintain the proper transmission velocity of the carrier in the tube.

It is thus evident that with this apparatus the closure of the main valve is normally determined by a time-off device, but that this time-off device is in turn controlled in its operation by the pressure conditions existing in the transmission tube at any instant, so that it is impossible for the time-off apparatus to cut off the carrier propelling air flow in such manner as to leave a carrier within the transmission line.

While the specific apparatus herein disclosed is efficient for the desired purpose, I contemplate that other equivalent arrangements and combinations of elements may be employed for the same purpose and regard all such equivalent constructions as falling within the spirit of the present invention.

I claim:

1. Pneumatic dispatch apparatus comprising a conduit and an exhauster connected therewith, a controlling valve located in the conduit, a minimum flow of air through the conduit being permitted when the valve is in closed position, a pneumatic exposed at one side to the pressure obtaining in the conduit and normally exposed at its other side to atmospheric pressure, said pneumatic being adapted to open wide the air controlling valve when the pressure in the conduit is reduced due to checking of said minimum flow by introducing a carrier into the conduit, and means normally operative during flight of the carrier through the conduit to cut off atmospheric pressure from said pneumatic, said means responding to any subsequent increase in suction in the conduit prior to discharge of the carrier and prior to closure of the air controlling valve again to admit atmospheric pressure to act on said pneumatic.

2. Pneumatic dispatch apparatus comprising a conduit and an exhauster connected therewith, a controlling valve located in the conduit, a minimum flow of air through the conduit being permitted when the valve is in closed position, a pressure sensitive pneumatic connected to the valve, said pneumatic responding to reduction in pressure in the conduit due to checking of the minimum flow caused by introducing a carrier into the conduit and by such response opening the valve, means tending slowly to restore the pneumatic to normal position during the flight of the carrier, and means preventing complete restoration of the pneumatic to normal position so long as the carrier remains in the conduit.

3. Pneumatic dispatch apparatus comprising a conduit and an exhauster connected therewith, a controlling valve located in the conduit, a minimum flow of air through the conduit being permitted when the valve is in closed position, means responsive to cutting off of said minimum flow by introducing a carrier into the conduit and by such response opening the controlling valve, means tending slowly to restore the valve to closed position during the flight of the carrier, and means preventing complete closure of the valve so long as a carrier remains in the conduit.

4. Pneumatic dispatch apparatus comprising a conduit and an exhauster connected therewith, a controlling valve located in the conduit, a minimum flow of air through the conduit being permitted when the valve is in closed position, means responsive to cutting off of said minimum flow by introducing a carrier into the conduit and by such response opening the controlling valve, means tending slowly to restore the valve to closed position during the flight of the carrier, and means, sensitively responsive to pressure conditions in the conduit, preventing closure of the valve so long as the air pressure in the conduit is below a predetermined amount.

5. Pneumatic dispatch apparatus comprising a conduit and an exhauster connected therewith, a controlling valve located in the conduit, a minimum flow of air through the conduit being permitted when the valve is in closed position, means responsive to cutting off of said minimum flow by introducing a carrier into the conduit and by such response opening the controlling valve, means tending slowly to restore the valve to closed position during the flight of the carrier, and means responsive during flight of the carrier to a drop in pressure in the conduit below the normal carrier impelling pressure to arrest the movement of the valve toward its closed position.

6. Pneumatic dispatch apparatus comprising a conduit and an exhauster connected therewith, a controlling valve located in the conduit, a minimum flow of air through the conduit being permitted when the valve is in closed position, means responsive to cutting off of said minimum flow by introducing a carrier into the conduit and by such response opening the controlling valve, means tending slowly to restore the valve to closed position during the flight of the carrier, and means responsive during flight of the carrier to a drop in pressure in the conduit below the normal carrier impelling pressure and by such response arresting the movement of the valve and restoring it to open position.

7. Pneumatic dispatch apparatus comprising a conduit and an exhauster connected therewith, a controlling valve located in the conduit, a minimum flow of air through the conduit being permitted when the valve is in closed position, a pressure sensitive pneumatic connected to the valve, said pneumatic responding to reduction in pressure in the conduit due to checking of the minimum flow by introducing a carrier into the conduit and by such response opening the valve, means tending to return the valve to closed position slowly and at a predetermined rate during the flight of the carrier, and means including a pneumatic responsive to presence of a carrier in the conduit for delaying closure of the valve so long as a carrier remains in the conduit.

8. Pneumatic dispatch apparatus comprising a conduit and an exhauster connected therewith, a controlling valve located in the conduit, a minimum flow of air through the conduit being permitted when the valve is in closed position, a pressure sensitive pneumatic connected to the valve, said pneumatic responding to reduction in pressure in the conduit due to checking of the minimum flow by introducing a carrier into the conduit and by such response opening the valve, means tending to return the valve to closed position slowly and at a predetermined rate during the flight of the carrier, and means including a pneumatic responsive during flight of the carrier to a drop in pressure in the conduit below the normal carrier impelling air pressure and by such response so changing the air pressure acting upon the first pneumatic as to cause it again to move the valve toward open position.

9. Power control apparatus for a pneumatic dispatch system of the vacuum minimum flow type having a transmission tube communicating with an exhauster, said apparatus comprising a main valve for controlling air flow through the tube, a minimum flow of air through the tube being permitted when the valve is closed, a main pneumatic connected to the valve, said pneumatic normally being exposed upon one side to atmospheric pressure and responding to reduction in pressure in the tube due to checking of the minimum flow by introducing a carrier into the tube and by so responding opening the main valve, an auxiliary valve controlling the admission of air pressure to one side of the pneumatic, means tending to return the pneumatic to normal position and thereby to close the valve during flight of the carrier, and actuator means for setting the auxiliary valve to cut off atmospheric pressure from the pneumatic and thereby to permit the pneumatic slowly to return to normal position, said actuator means being responsive to presence of a carrier in the tube and by such response resetting the auxiliary valve to admit atmospheric pressure to the pneumatic to prevent closure of the main valve prior to delivery of the carrier from the tube.

10. Power control apparatus for a pneumatic dispatch system of the vacuum minimum flow type having a transmission tube communicating with an exhauster, said apparatus comprising a main valve for controlling air flow through the tube, a minimum flow of air through the tube being permitted when the valve is closed, a main pneumatic connected to the valve, said pneumatic normally being exposed upon one side to atmospheric pressure and responding to reduction in pressure in the tube due to checking of the minimum flow by introducing a carrier into the tube and by so responding opening the main valve, an auxiliary valve controlling the admission of air pressure to one side of the pneumatic, said auxiliary valve having a plurality of operative positions in two of which it admits atmospheric air to act on the main pneumatic and in another of which it cuts off atmospheric pressure from the main pneumatic, an actuator pneumatic, and means permanently connecting the actuator pneumatic to the auxiliary valve, 11. Power control apparatus for a pneumatic dispatch system of the vacuum minimum flow type having a transmission tube communicating with an exhauster, said apparatus comprising a valve for controlling air flow through the tube, a minimum flow of air through the tube being permitted when the valve is closed, a main pneumatic connected to the valve, said pneumatic normally being exposed upon one side to atmospheric pressure and responding to reduction in pressure in the tube due to checking of the minimum flow by introducing a carrier into the tube and by so responding opening the main valve, an auxiliary valve controlling the admission of air pressure to one side of the pneumatic, an actuator pneumatic connected to the auxiliary valve, and springs tending to retain both pneumatics in normal position, the spring acting on the actuator pneumatic being stronger than the other, the springs being so tensioned that the main pneumatic responds to checking of the minimum flow and the actuator pneumatic responds only when the main valve is open, the auxiliary valve cutting off atmospheric pressure from the main pneumatic during normal flight of the carrier.

12. Power control apparatus for a pneumatic dispatch system of the vacuum minimum flow type having a transmission tube communicating with an exhauster, said apparatus comprising a valve for controlling air flow through the tube, a minimum flow of air through the tube being permitted when the valve is closed, a main pneumatic connected to the valve, said pneumatic normally being exposed upon one side to atmospheric pressure and responding to reduction in pressure in the tube due to checking of the minimum flow by introducing a carrier into the tube and by so responding opening the main valve, an auxiliary valve controlling the admission of air pressure to one side of the pneumatic, an actuator pneumatic connected to the auxiliary valve, said actuator pneumatic normally holding the auxiliary valve in position to admit atmospheric pressure to one side of the main pneumatic, the actuator pneumatic responding to the pressure of carrier impelling air flow in the tube to position the auxiliary valve to cut off atmospheric pressure from the main pneumatic, the actuator pneumatic also responding to decrease in pressure in the tube during flight of the carrier and by such response resetting the auxiliary valve to admit atmospheric pressure to act on the main pneumatic.

13. Power control apparatus for a pneumatic dispatch system of the vacuum minimum flow type having a transmission tube communicating with an exhauster, said apparatus comprising a valve for controlling air flow through the tube, a minimum flow of air through the tube being permitted when the valve is closed, a main pneumatic connected to the valve, said pneumatic responding to reduction in pressure in the tube due to checking of the minimum flow by introducing a carrier into the tube and by so responding opening the main valve, an auxiliary valve controlling the admission of air pressure to one side of the pneumatic, said auxiliary valve being reciprocable in a predetermined path and being constructed and arranged to admit atmospheric pressure to act on the main pneumatic when at either end of its path of movement but to cut off atmospheric pressure from the main pneumatic when at an intermediate part of its path, and an actuator pneumatic for moving the auxiliary valve.

14. Power control apparatus for a pneumatic dispatch system of the vacuum minimum flow type having a transmission tube communicating with an exhauster, said apparatus comprising a valve for controlling air flow through the tube, a minimum flow of air through the tube being permitted when the valve is closed, a main pneumatic connected to the valve, said pneumatic responding to reduction in pressure in the tube due to checking of the minimum flow by introducing a carrier into the tube and by so responding opening the main valve, an auxiliary valve controlling the admission of air pressure to one side of the pneumatic, said auxiliary valve having more than two operative positions, and an actuator pneumatic permanently connected to the auxiliary valve and also having a corresponding number of operative positions.

15. Power control apparatus for a pneumatic dispatch system of the vacuum minimum flow type having a transmission tube communicating with an exhauster, said apparatus comprising a valve for controlling air flow through the tube, a minimum flow of air through the tube being permitted when the valve is closed, a main pneumatic connected to the valve, said pneumatic normally being exposed upon one side to atmospheric pressure and responding to reduction in pressure in the tube due to checking of the minimum flow by introducing a carrier into the tube and by so responding opening the main valve, an auxiliary valve controlling the admission of air pressure to one side of the pneumatic, and an actuator pneumatic for moving the auxiliary valve, the actuator pneumatic normally holding the auxiliary valve in a position such that it admits atmospheric air to act on the main pneumatic, said auxiliary pneumatic responding to high suction in the tube when the main valve opens and before the carrier acquires the normal speed of flight and thereby moving the auxiliary valve to a position in which it admits atmospheric pressure to act on the main pneumatic, the actuator pneumatic also responding to the slight drop in suction as the carrier attains full speed and by such response positioning the auxiliary valve to cut off the main pneumatic from the atmosphere.

16. Power control apparatus for a pneumatic dispatch system of the vacuum minimum flow type having a transmission tube communicating with an exhauster, said apparatus comprising a valve for controlling air flow through the tube, a minimum flow of air through the tube being permitted when the valve is closed, a main pneumatic connected to the valve, said pneumatic normally being exposed upon one side to atmospheric pressure and responding to reduction in pressure in the tube due to checking of the minimum flow by introducing a carrier into the tube and by so responding opening the main valve, an auxiliary valve controlling the admission of air pressure to one side of the pneumatic, and an actuator pneumatic connected to the auxiliary valve, said auxiliary pneumatic responding to high suction in the tube when the main valve opens and before the carrier acquires the normal speed of flight and thereby moving the auxiliary valve to a position in which it admits atmospheric pressure to act on the main pneumatic, the actuator pneumatic also responding to the slight drop in suction as the carrier attains full speed to position the auxiliary valve to cut off the main pneumatic from the atmosphere.

17. Power control apparatus for a pneumatic dispatch system of the minimum flow type having a transmission tube and an exhauster connected therewith, said apparatus comprising a main valve which controls carrier impelling air flow through the transmission tube, a pneumatic connected to the main valve, said pneumatic separating two chambers each of which communicates with the tube, one by means of a relatively large passage and the other by means of a relative small restricted passage, the latter chamber normally communicating with the outer air, an auxiliary valve for cutting off said latter chamber from the atmosphere, and an actuator pneumatic permanently connected to the auxiliary valve, said actuator pneumatic separating chambers one of which is always open to the atmosphere and the other of which transmission tube pressure always obtains.

18. Power control apparatus for a pneumatic dispatch system of the minimum flow type having a transmission tube and an exhauster connected therewith, said apparatus comprising a main valve which controls carrier impelling air flow through the transmission tube, main and auxiliary casings, a main pneumatic dividing the main casing into two chambers, one of which is freely open to the transmission tube and the other of which communicates with the tube by means of an adjustably restricted passage, means connecting the main valve to the main pneumatic, an auxiliary valve controlling the admission of atmospheric air to the last named chamber of the main casing, said auxiliary valve normally admitting air to said chamber, an actuator pneumatic dividing the auxiliary casing into two chambers, one of which is always open to the atmosphere and the other of which is connected by an unrestricted passage to the transmission tube, means permanently connecting the actuator pneumatic to the auxiliary valve, a light spring tending to hold the main pneumatic in normal position but permitting it to respond to reduction in pressure due to cutting off the minimum flow, and a relatively heavy spring tending to hold the actuator pneumatic in normal position but permitting the latter to move and thereby to place the auxiliary valve in a position such that it cuts off atmospheric pressure from the main pneumatic during flight of the carrier.

Signed by me at Syracuse, New York, this seventh day of August, 1925.

JAMES G. MACLAREN.